A. BROCK, Jr. & A. J. MOTTLAU.
POWER TRANSMISSION.
APPLICATION FILED DEC. 28, 1914.

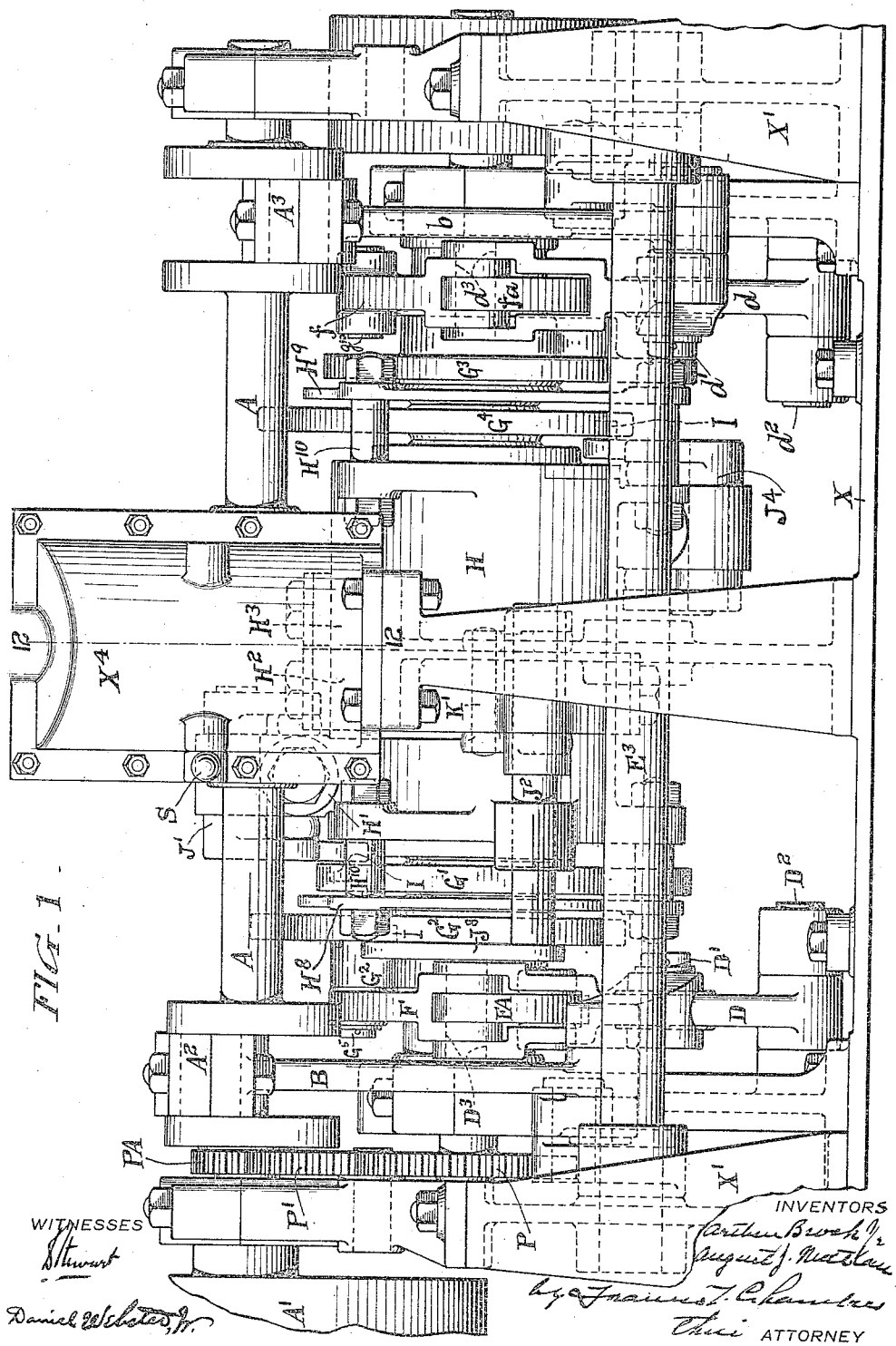

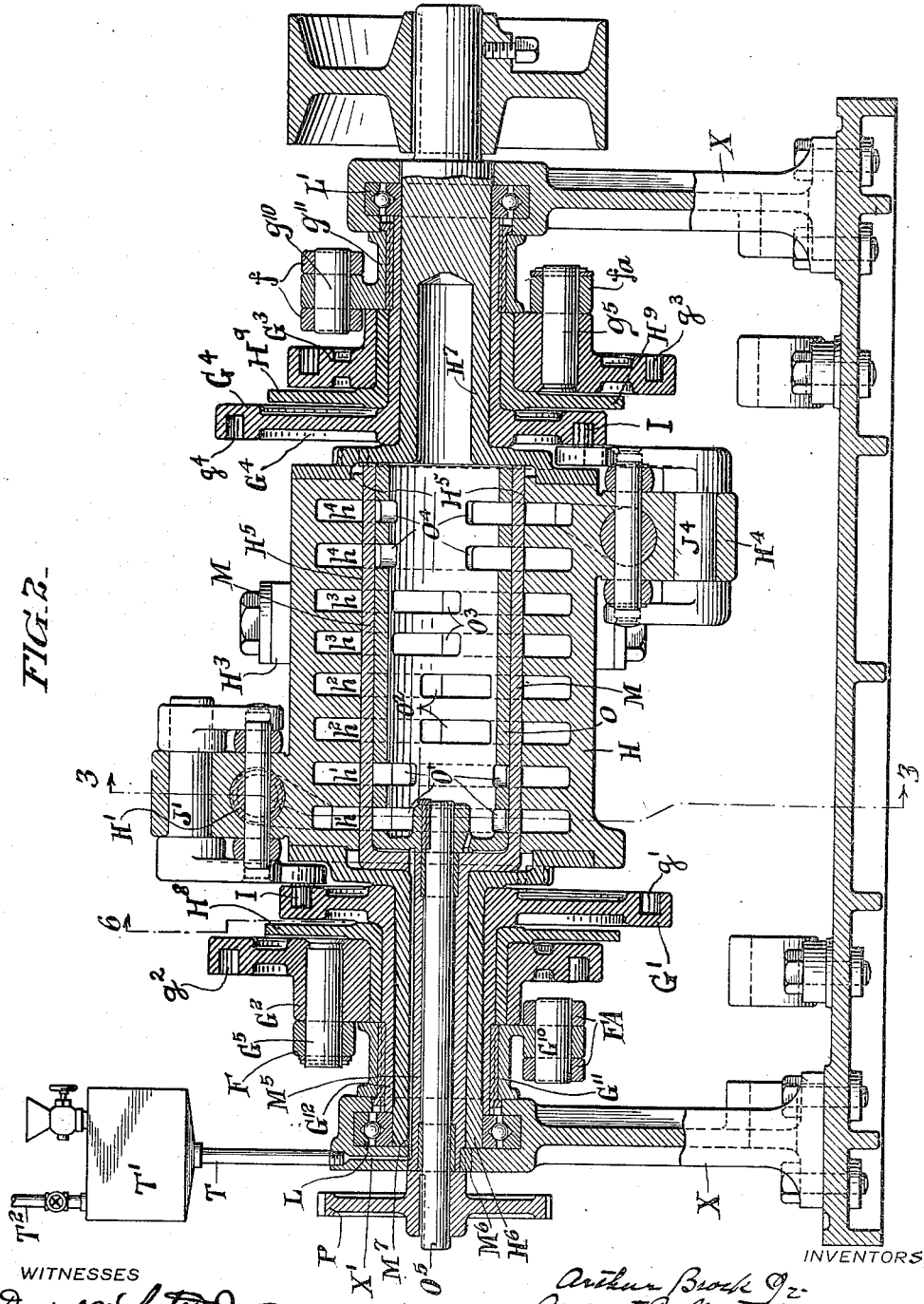

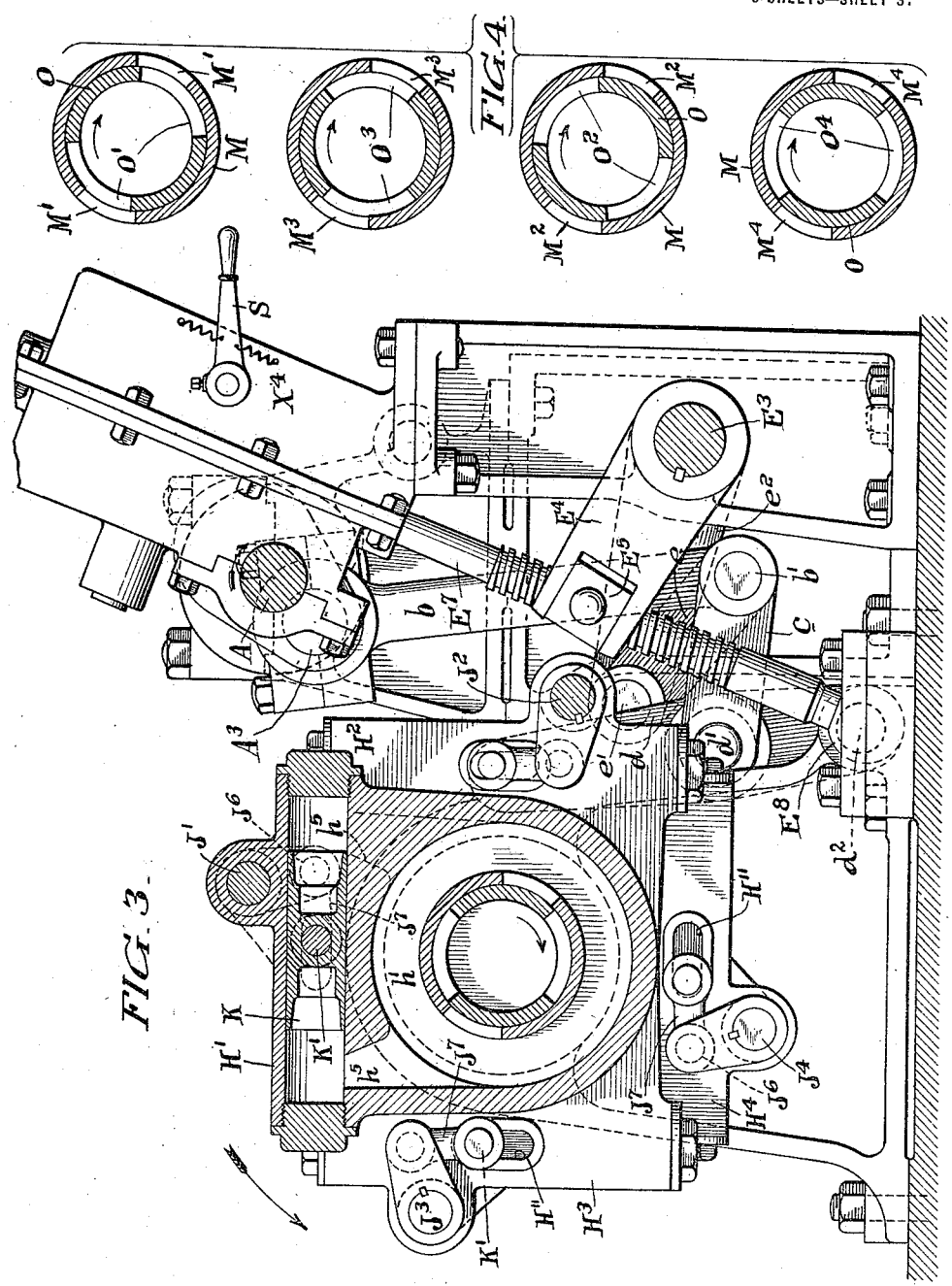

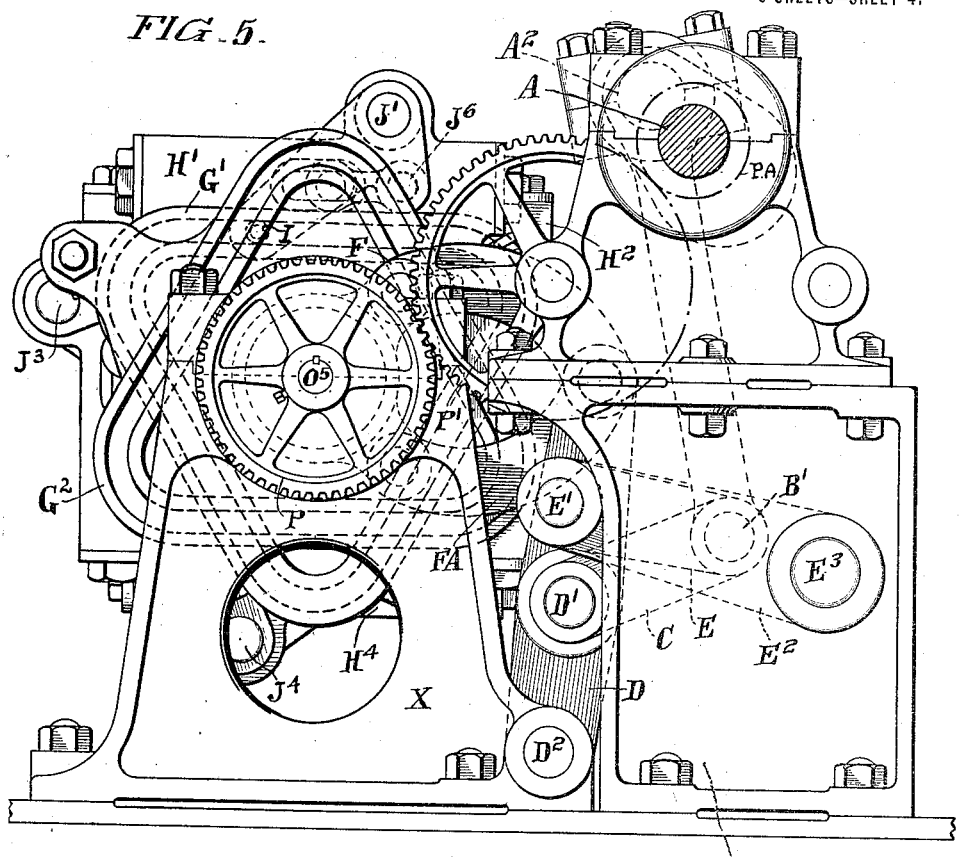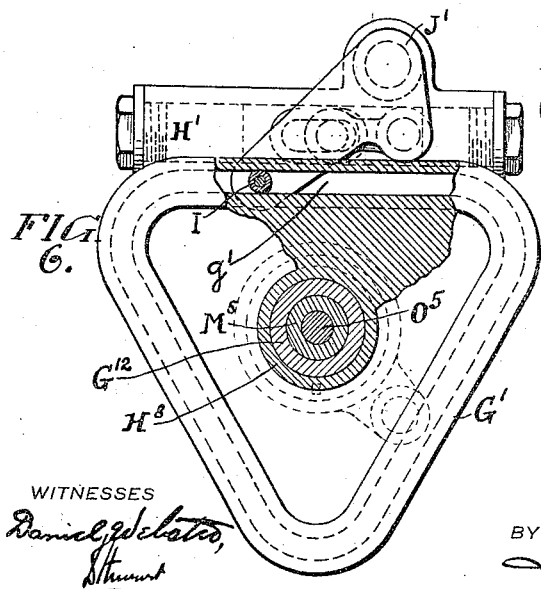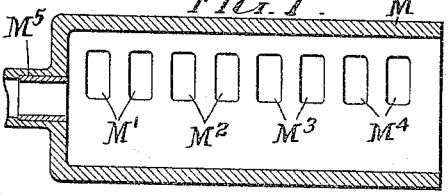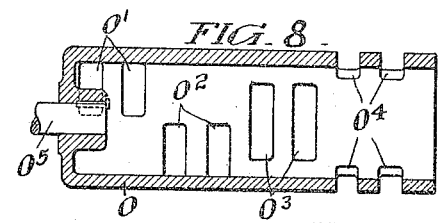

1,195,335.

Patented Aug. 22, 1916.
6 SHEETS—SHEET 5.

A. BROCK, Jr. & A. J. MOTTLAU.
POWER TRANSMISSION.
APPLICATION FILED DEC. 28, 1914.
1,195,335.
Patented Aug. 22, 1916.
6 SHEETS—SHEET 6.
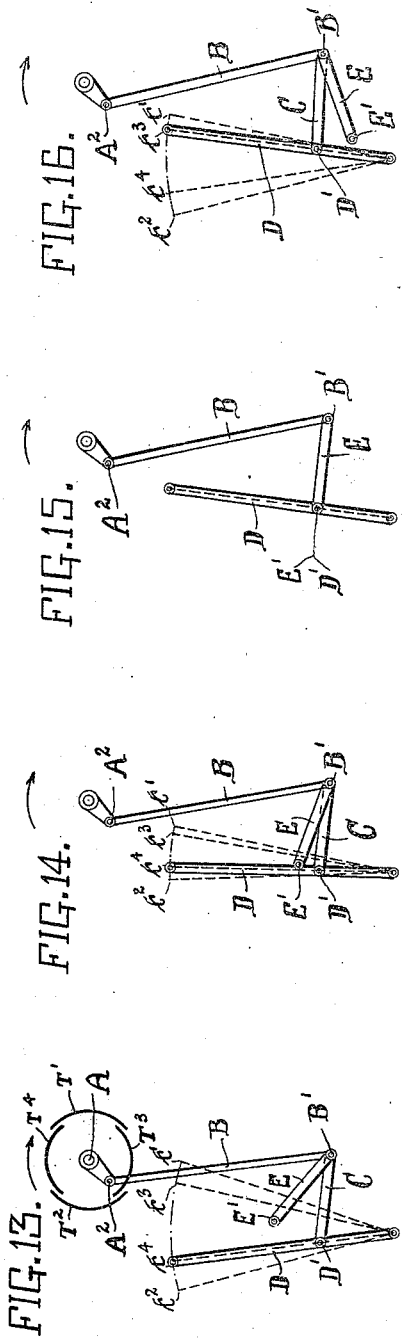
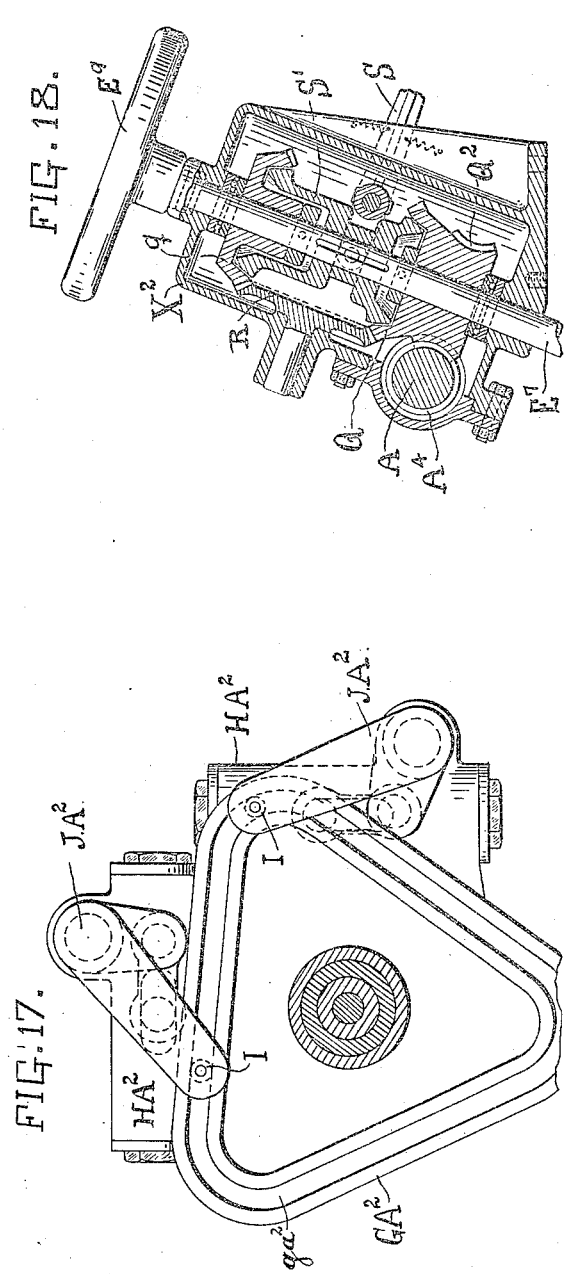

UNITED STATES PATENT OFFICE.

ARTHUR BROCK, JR., AND AUGUST J. MOTTLAU, OF PHILADELPHIA, PENNSYLVANIA, ASSIGNORS TO MOTTLAU TRANSMISSION, INCORPORATED, OF NEW YORK, N. Y., A CORPORATION OF NEW YORK.

POWER TRANSMISSION.

1,195,335.      Specification of Letters Patent.      Patented Aug. 22, 1916.

Application filed December 28, 1914. Serial No. 879,259.

*To all whom it may concern:*

Be it known that we, ARTHUR BROCK, Jr., and AUGUST J. MOTTLAU, both citizens of the United States of America, residing in the city and county of Philadelphia, in the State of Pennsylvania, have invented certain new and useful Improvements in Power Transmission, of which the following is a true and exact description, reference being had to the accompanying drawings, which form a part thereof.

Our present invention consists in a novel mechanism for transmitting power from one shaft to another, and comprising provisions for varying the ratio of the rotative speeds of the two shafts at will; and the general object of our invention is to provide an improved mechanism for the purpose described.

In carrying out our invention we employ a plurality of clutch mechanism, each including a reciprocating member which is connected to the driving shaft and is reciprocated thereby synchronously with the driving shaft, but with an amplitude of movement which may be varied as desired. Each clutch mechanism comprises means for intermittently connecting its actuating member to the driven shaft, so that the reciprocating movement of the actuating member imparts a rotative thrust to the driven shaft. The amplitude of the movement imparted to the driven shaft by each impulse of each clutch mechanism depends upon the amplitude of movement of the actuating member of the clutch mechanism. The clutch mechanism employed comprises provisions whereby each rotative thrust imparted to the driven shaft is transmitted in part through a body of liquid trapped in a piston chamber, and thereby preventing movement of the piston working in said chamber. The operation of the mechanism does not depend in any way, however, upon the pressure differential due to partially throttling the flow of a liquid through an orifice.

The various features of novelty characterizing our invention are pointed out with particularity in the claims annexed to and forming a part of this specification. For a better understanding of the invention however, and of the advantages possessed by it, reference should be had to the accompanying drawings and descriptive matter, in which we have illustrated and described apparatus of preferred form in which our invention may be embodied.

Figure 9:
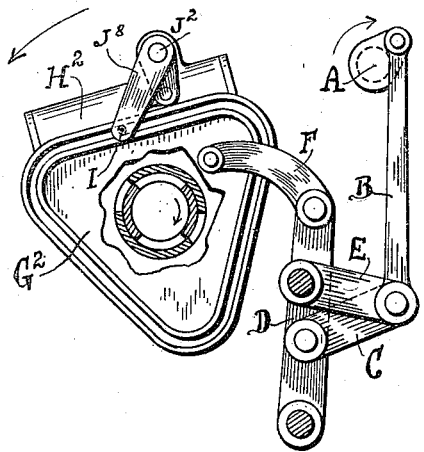
Figure 10:
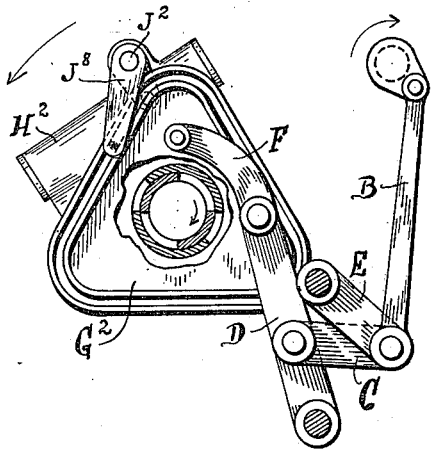
Figure 11:
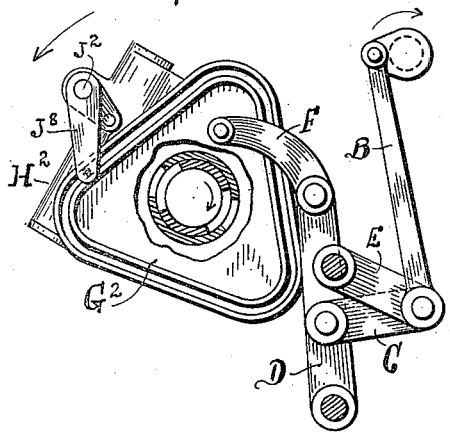
Figure 12:
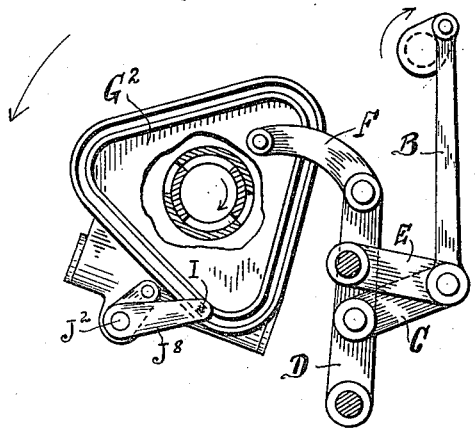

Of the drawings: Figure 1 is an elevation of a preferred embodiment of our invention. Fig. 2 is a longitudinal section of the mechanism shown in Fig. 1. Fig. 3 is a section taken on the line 3—3 of Fig. 2. Fig. 4 shows transverse sections through the main valve mechanism, taken simultaneously, at different points along the length of the valve mechanism. Fig. 5 is an end elevation of the power transmitting mechanism, with the driving shaft in section. Fig. 6 is an end elevation of a portion of the mechanism with parts broken away and in section. Fig. 7 is a longitudinal sectional elevation of the stationary valve member. Fig. 8 is a sectional elevation, taken similarly to Fig. 2, of the movable valve member. Fig. 9 is a diagram, illustrating the operation of the mechanism. Figs. 10, 11 and 12 are views taken similarly to Fig. 9, but showing the parts in different relative positions. Fig. 13 is a diagram of the linkage in one adjustment. Figs. 14, 15 and 16 are diagrams similar to Fig. 13, but showing the linkage in different adjustments. Fig. 17 is a view generally similar to Fig. 6, but illustrating a modification; and Fig. 18 is a sectional elevation of a portion of the linkage adjusting mechanism.

The mechanism shown in the drawings comprises a stationary framework X, in which is journaled the driving shaft A of the machine. The shaft A is shown as carrying a pulley A' at one end, by means of which power may be transmitted to the shaft A, though it is to be understood that the latter may be directly connected to a suitable driving motor. As shown, the shaft A is formed with two crank portions $A^2$ and $A^3$ adjacent its ends, the crank pin proper, $A^2$, being set at an angle of 90° in advance of the pin $A^3$. A connecting rod B, journaled at its upper end on the crank pin $A^2$, is pivotally connected at its lower end by a pivot pin B' to one end of each of two links C and E. The opposite end of the link C is pivotally connected by the pivot pin D' to a lever D, the lower end of which is pivotally connected by the pivot pin $D^2$ to the framework X. The end of the link E remote from the pivot pin B′ is connected by the pivot pin E′ to an arm E² of a rock shaft E³. The latter with its arm E² is normally stationary, but may be angularly adjusted by means of an arm E⁴ secured to the shaft E³ and a nut E⁵ mounted in the free end of the arm E⁴ and surrounding the threaded shaft E⁷. The latter is provided with a ball and socket joint E⁸ at its lower end, and is provided at its upper end with a hand wheel E⁹, by which the shaft E⁷ may be rotated and the arm E⁴ turned in one direction or the other. A power mechanism, hereinafter described, is also provided for utilizing the motion of the driving shaft A in rotating the shaft E⁷ to effect an angular adjustment of the shaft E³.

When the rock shaft E³ and the arm E⁴ connected to it are angularly adjusted, the pivot pin E′ is moved toward or away from the position in which its axis coincides with the axis of the pin D′; the links C and E being of the same length. When the pins E′ and D′ are coaxial, it is apparent that as the connecting rod B is raised and lowered by the rotation of the shaft A, the pin B′ will oscillate about the axis of the pin D′ without imparting oscillatory movement to the lever D; but with the pin E′ out of alinement with the pin D′, the movements of the rod B will impart oscillatory movement to the lever D. The amplitude of the to and fro movements thus imparted to the lever D, on each rotation of the shaft A, will vary with the distance between the axes of the pins E′ and D′. The effect of adjusting the pin E′ is illustrated in Figs. 13 to 16, inclusive. Moreover, a movement of the pin B′ in the direction to cause the lever D to swing to the left when the pivot pin E′ is above the path of the pin D′, will cause the lever D to move to the right when the pivot pin E′ is below the path of the pivot pin D′. The oscillatory movements imparted to the lever D through the connecting rod B may thus not only be varied in amplitude, but reversed in direction, by the angular adjustment of the shaft E³.

A connecting rod b has its upper end connected to the crank pin A³ and its lower end connected through a pin b′ to links c and e. The opposite end of the link c is connected by a pin d′ to a lever d pivoted to the framework X by a pin d², and generally similar to the lever D. The link e is connected by a pin e′ to an arm e² similar to the arm E² and carried by the rock shaft E³. The movements imparted to the lever d will be in synchronism with, and of the same amplitude as, but are 90° in phase behind, the movements of the lever D.

The lever D is connected at its upper end by a pin D³ to two curved connecting rods F and FA. These connecting rods are pivotally connected at their opposite ends to two oscillating cams G² and G′, respectively, and the upper end of the lever d is similarly connected through a pin d³ and connecting rods f and fa to two other cams G⁴ and G³.
These cams are mounted on a revoluble member H, as hereinafter explained, to oscillate about the axis of the latter. The cams G′, G², G³ and G⁴ are formed with cam ways g′, g², g³ and g⁴, respectively. Each cam way is in the form of a groove in the side of the corresponding cam the groove being continuous or closed on itself and comprising straight tangential portions and curved connecting portions.

The connecting rod F is directly connected to the cam G² through the pivot pin G⁵. The cam G² is journaled on the elongated hub portion of a member H⁸, which is connected by bolts H¹⁰ to a chambered rotatable member H, forming a part of the driven shaft. The cam G′ has an elongated hub journaled in the hub of the member H⁸, and journaled on the hollow shaft extension H⁶ secured to one end of the member H. At its outer end the shaft extension H⁶ is journaled in the framework X by a ball bearing L. The connecting rod FA is connected to the cam G′ through a pivot pin G¹⁰ mounted in a collar G¹¹ keyed to the outer end of the hub of the cam G′. The cams G³ and G⁴ are separated by a member H⁹, generally similar to the member H⁸, and having a hub portion on which the cam G³ is journaled, and in which the hub of the cam G⁴ is also journaled. The connecting rod f is connected to the cam G⁴ by means of a pin g¹⁰ and sleeve g¹¹, similar in construction and arrangement to the pin and collar G¹⁰ and G¹¹, respectively. The connecting rod fa is directly connected to the cam G³ by a pin g⁵. The cam G⁴ surrounds and is journaled on the shaft extension H⁷, which is secured at one end to the member H, and at its outer end is journaled in the framework X through the ball bearing L′.

The member H, as shown, is a chambered casting provided with a central valve chamber H⁵, and with tangential piston chambers H′, H², H³ and H⁴, the latter being successively displaced both along and angularly about the axis of the member H. The axes of the chambers H′ and H⁴ are parallel and at opposite sides of the axis of the member H. Similarly, the piston chambers H² and H³ have their axes parallel to one another, but on opposite sides of the axis of the member H and at right angles to the axes of the piston chambers H′ and H⁴. As before stated, the member H is formed with a central valve chamber H⁵, which is surrounded by eight annular chambers open at their inner edges to the chamber H⁵. Two of these annular chambers, marked h′, are connected, one to one end, and the other to the opposite end, of the piston chamber H′, the connection being through ports $h^5$. Similarly, the opposite ends of the piston chamber $H^2$ are connected to the annular chambers $h^2$; the opposite ends of the piston chamber $H^3$ are connected to the annular chambers $h^3$; and the opposite ends of the piston chamber $H^4$ are connected to the annular chambers $h^4$. Located within, and fitting snugly against the curved wall of the valve chamber $H^5$, is a stationary hollow valve M. The latter is provided with an elongated sleeve-like stem $M^5$, which projects through the hollow shaft $H^6$, and is anchored to the framework X as by the key $M^6$. Mounted within the valve M is the hollow valve O, which has an operating stem $O^5$ secured to one end. This stem is mounted in the hollow stem $M^5$, and at its outer end carries a gear P. This gear, and thereby the valve O, are driven at half the angular speed of the driving shaft through an idler gear P' and a driving gear PA secured to the driving shaft A. The valve member M is formed with two diametrically opposed rows of ports, each row comprising two ports M', two ports $M^2$, two ports $M^3$ and two ports $M^4$. The ports M', $M^2$, $M^3$ and $M^4$ each communicate with a corresponding annular chamber $h'$, $h^2$, $h^3$ or $h^4$. The valve member O is formed with four ports O', four ports $O^2$, four ports $O^3$ and four ports $O^4$. Two of the ports O' are arranged alongside of one another, and the other two ports O' are diametrically opposed to the first mentioned pair. Similarly, the ports $O^2$, $O^3$ and $O^4$ are arranged in diametrically opposed pairs. The various ports in the valve O are angularly displaced about the axis of the valve member O, as shown in Figs. 4 and 8. The various ports extend circumferentially about the axis of the valve members M and O, so that each of the ports O', $O^2$, $O^3$ and $O^4$ will be out of register with the corresponding ports M', $M^2$, $M^3$ or $M^4$, and the latter thereby closed once during each revolution of the driving shaft and for a period of time corresponding to slightly more than a quarter of the time required for each rotation of the driving shaft. In the arrangement shown the ports M' $M^3$, $M^2$ and $M^4$ close in the order stated.

Working in each of the piston chambers H', $H^2$, $H^3$ and $H^4$ is a corresponding piston K. Through each piston K extends a pin K' which projects through slots $H^{11}$ in the opposite walls of the corresponding piston chamber. The pins K' of the pistons K working in the chambers H', $H^2$, $H^3$ and $H^4$ are connected by links $J^7$ and pivot pins $J^6$ to corresponding rockers J', $J^2$, $J^3$ and $J^4$. Each of these rockers is journaled in bosses formed on the member H. The rockers J', $J^2$, $J^3$ and $J^4$ are connected to the cams G', $G^2$, $G^3$ and $G^4$ respectively by means of rolls I one of which is journaled on each of the rockers and works in the cam groove in the corresponding cam. The rolls I for the rockers J' and $J^4$ are each carried by the rocker arm carrying the corresponding pivot pin $J^6$. In the case of the rocker $J^2$ a separate arm, $J^8$, (see Fig. 1) is provided to support the corresponding roll I. The roll I, not shown in the drawings, for the rocker $J^3$ is supported in a similar manner.

The various chamber spaces in the member H are filled with a relatively incompressible liquid, which in practice will ordinarily be oil. To insure that the spaces within the member H are at all times filled with the oil or other relatively incompressible fluid employed, notwithstanding such leakage as may occur, we provide a filling channel $M^7$ in the valve stem $M^5$, and a registering channel X' in the framework X, and connect to the outer end of the channel X' a pipe T, which may lead from a reservoir T' kept wholly or partially filled with oil or other liquid employed. If found necessary or desirable, the liquid in the chamber T' may be put under pressure as by means of compressed air admitted through the pipe $T^2$.

To facilitate the operation of angularly adjusting the shaft $E^3$ to vary the speed of the driven shaft, we preferably provide means for gearing the shaft $E^7$ to the driving shaft, in order to use the power of the driving shaft in changing the ratio of transmission. One form of mechanism for accomplishing this purpose is shown in Fig. 18. As shown in this figure, there are loosely mounted on the shaft $E^7$ two bevel gears Q and $q$, which are in mesh with an idler R journaled in a housing $X^2$ which incloses this gearing. The gear wheel Q is formed with gear teeth $Q^2$ in mesh with a worm $A^4$ carried by the driving shaft A, so that the gears Q and $q$ are constantly rotated in opposite directions by the shaft A. Splined on the shaft $E^7$ between the gears Q and $q$ is a double ended friction clutch member S' which may be moved by a lever S into frictional engagement with either of the gears Q or $q$ as desired, but in its normal position is out of engagement with each of these gears.

The means for utilizing the power of the driving shaft to adjust a variable speed transmission, and the means disclosed for transmitting motion from the driving shaft to the levers D and $d$, are not our joint invention, but are the invention of one of us, namely, August J. Mottlau, and are claimed in his application, Serial No. 855,124, filed August 5, 1914.

Whenever the ports in the valve member M pertaining to any one of the chambers H', $H^2$, $H^3$, and $H^4$ are closed, the corresponding piston K is held against movement therein by the liquid then trapped in the ends of that chamber. Whenever any piston K is thus held against movement in its piston chamber, it in conjunction with the corresponding rocker $J'$, $J^2$, $J^3$ or $J^4$ serves to lock the driven member H to the corresponding cam $G'$, $G^2$, $G^3$ or $G^4$. This locking of the driven shaft to the cam is due to the fact that relative movements of each cam and the driven shaft necessitates a relative angular movement of the corresponding rocker, which can only be accommodated by a movement of the corresponding piston K in the chamber in which it works.

In operation, the rotation of the shaft A imparts oscillatory movements to the cams $G'$, $G^2$, $G^3$ and $G^4$, each cam receiving one complete oscillation, or to and fro movement, on each rotation of the shaft A. In any one adjustment of the shaft $E^3$, the different cams $G'$, $G^2$, $G^3$ and $G^4$ receive angular movements of the same amplitude. The oscillatory movements of the cams $G'$ and $G^2$ are 180° out of phase with one another, and this is true of the movements of the cams $G^3$ and $G^4$. The oscillatory movement of the cam $G'$ is 90° in advance of the movement of the cam $G^3$, and the cam $G^2$ has its movements 90° in advance of the movements of the cam $G^4$.

The successive closures of the ports $M'$, $M^3$, $M^2$ and $M^4$ are so timed relatively to the movements of the cams $G'$, $G^3$, $G^2$ and $G^4$, that the latter are successively locked to the driven member H during the portions of each rotation of the driven shaft A corresponding to the overlapping arcs $T'$ $T^3$, $T^2$ and $T^4$, respectively, shown in Fig. 13. Each cam is thus locked to the member H during an intermediate portion of the angular movement of the cam in one direction; for instance, in Figs. 13, 14 and 16, the arc $t'$—$t^2$ represents the total angular movement of the lever D, and the arc $t^3$—$t^4$ respresents the portion of the movement of the lever D during which the cam $G'$ is locked to the member H, while the arc $t^4$—$t^3$ represents the portion during which the cam $G^2$ is locked to the member H. With a properly proportioned and arranged valve mechanism and linkage of the character disclosed, the ratio of the angular movement of each cam during the period in which it is locked to the member H, to the angular movement of the driving shaft A, will vary only to a minute and practically unimportant extent. An adjustment in the distance between the axes of pins $D'$ and $E'$ does not change the portions of the time in which the shaft A makes a revolution during which the different cams are locked to the member H, but does vary the rotative speed of the latter by varying the amplitude of the reciprocatory movements of the cam. The maximum rotative speed of the member H relative to that of the driving shaft A depends upon the proportions of the parts, and may be made greater or less than the speed of the shaft A. In the arrangement shown, the maximum angular speed of the member H is intended to be half that of the shaft A. An increase in the number of successively actuated cams tends to a closer approximation to absolute uniformity in the ratio between the movements of the member H and shaft A. For practically all purposes, however, sufficiently good results are obtained with four cams, as shown, and for most purposes three cams, each locked to the driven member for a trifle more than one-third of each revolution of the driving shaft, will give a sufficiently uniform motion. The use of three cams requires three driving cranks and sets of connecting links, however.

While it is generally true that relative movement of each of the cams $G'$, $G^2$, $G^3$ and $G^4$ to the driven shaft member H necessitates angular movements of the different rockers $J'$, $J^2$, $J^3$ and $J^4$, it will be apparent that when any cam roll I is in the curved portion connecting an adjacent pair of flat portions of the cam groove in which it works a slight angular movement of the corresponding cam relative to the driven shaft may occur, without a corresponding movement of the cam roll I toward or away from the common axis of the cam and driven shaft. With properly designed apparatus of the general type shown in Figs. 1 to 8 of the drawings, the slippage, so to speak, which may occur as the different cam rolls pass through the different curved connecting portions of the corresponding cam grooves, is of minor importance. Such slippage moreover, may be entirely avoided by the simple expedient of providing two locking cylinders and corresponding rockers and cam rolls to operate in conjunction with each cam. For instance, as shown in Fig. 17, the cam $GA^2$ which may be identical with the cam $G^2$, receives in its cam groove rolls I carried by two rockers $JA^2$. The two rockers $JA^2$ are connected to pistons working in two tangential locking cylinders $HA^4$ which have their axes at an angle of about 90° to one another and are connected to the same annular chambers of the member H so that each locking cylinder $HA^2$ will have liquid trapped therein in the same manner and at the same time as liquid is trapped in the cylinder $H^2$ in the construction first described. With this arrangement, when the cam $GA^2$ and driven shaft H occupy such relative positions that the cam roll I of either of the rockers $JA^2$ is in a curved portion of the cam groove $ga^2$, the cam roll I carried by the other rocker $JA^2$ will be in a flat portion of the cam groove and will have to move toward or away from the axis of the shaft to accommodate relative angular movement of the cam and driven shaft.

It is apparent that our invention in its broader aspects consists essentially of a driving element, a driven element, a plurality of reciprocating members, with means for intermittently connecting them to the driving element, and means through which reciprocating movements of varying amplitudes may be imparted to said members by said driving element. It will be apparent, moreover, that each of these main characteristic features of our invention may vary in form from the embodiments thereof found in the apparatus specifically disclosed herein. In general, however, we consider it desirable, to employ means for intermittently connecting said reciprocating members to the driven element which comprise provisions for trapping a body of liquid through which the driving thrust is wholly or partially transmitted. The particular form of the reciprocating members (G', G², G³ and G⁴), and the means for intermittently locking them to the driven element specifically disclosed herein, possesses an important advantage, from the fact that each of the cams G', G², G³ and G⁴ is journaled on a part which is coaxial with and forms a part of the driven shaft, so that there is no movement against frictional resistance of the cams when intermittently locked to the driven element. The arrangement of the piston chambers H', H², H³ and H⁴ at an appreciable distance from the axis of the shaft H permits of a desirably low maximum fluid pressure in these chambers.

The particular form of valve mechanism shown in the drawings possesses certain desirable characteristics. For instance, the arrangement of the ports M', M², M³ and M⁴ in diametrically opposed pairs, insures a desirable balance of pressures acting on the opposite sides of the valve member O; and the duplication of the ports O', O², O³ and O⁴, which is made necessary by, and requires that the rotation of the valve O be at half the speed of the driving shaft A, makes possible a very large aggregate port area.

While in accordance with the provisions of the statutes we have disclosed the best form of our invention now known to us, it will be apparent to those skilled in the art that many changes may be made in the form of apparatus disclosed herein without departing from the spirit of the invention claimed by us, and that under some conditions certain features of our invention may be used without a corresponding use of other features.

Having now described our invention, what we claim is new and desire to secure by Letters Patent, is:

1. The combination with an oscillatory driving element, of a driven shaft element, and means for alternately clamping said oscillating element to, and releasing it from said driven shaft element comprising coöperating piston and cylinder parts both of which share in the general movements of one of said elements and provisions for causing fluid pressure changes to take place in said cylinder in timed relation to the movements of said oscillatory element.

2. In combination, an oscillatory driving element, a driven shaft element, and means for alternately clamping said oscillatory element to, and releasing it from said driven shaft element comprising a cylinder and a piston working therein both of which share in the general movements of one of said elements but move relatively to one another when said elements move relatively to one another and a valve means operating in timed relation with the movements of said oscillating element for intermittently trapping liquid in said cylinder whereby the piston is held against movement therein.

3. The combination with driving and driven shafts of an oscillatory element, means connecting said element to the driving shaft whereby said element is oscillated by the shaft, said means being adjustable to permit of variations in the amplitude of the oscillatory movement given said element, and means for alternately clamping said element to and releasing it from said driven shaft comprising a cylinder and a piston working therein both piston and cylinder sharing in the general rotative movements of said driven shaft but moving relatively to one another when said element moves relatively to said driven shaft, and valve means operating in timed relation with the movements of the driving shaft for intermittently trapping liquid in said cylinder.

4. In combination, a driven shaft, a driving member mounted to oscillate about the axis of rotation of said shaft, a part engaged by said member and moved thereby relatively to the driven shaft on movements of said member relative to said shaft and means for intermittently locking said member to said shaft comprising a coöperating piston and cylinder, one of which is connected to said driven shaft and the other to said part and valve mechanism operated in timed relation to the movements of said member for intermittently trapping a fluid in and releasing it from said cylinder.

5. In combination, a driven shaft, an oscillating cam mounted on said shaft to turn relative thereto about an axis coincident with the axis of rotation of the shaft and formed with a cam surface eccentric to said axis, a rocker pivotally mounted on said driven shaft and engaging said cam surface and moved thereby angularly about its pivotal connection to said shaft on relative angular movements of said cam and shaft, and means for intermittently holding said rocker against movement relative to said shaft.

6. In combination, a driven shaft, an oscillating cam mounted on said shaft to turn relative thereto about an axis coincident with the axis of rotation of the shaft and formed with a cam surface eccentric to said axis, a rocker pivotally mounted on said driven shaft and engaging said cam surface and moved thereby angularly about its pivotal connection to said shaft on relative angular movements of said cam and shaft, and means for intermittently holding said rocker against movements relative to said shaft and thereby locking said cam to said shaft comprising coöperating piston and cylinder parts connected one to said driven shaft and the other to said rocker and a valve mechanism operating in timed relation to the movement of said cam for trapping a fluid in, and releasing it from said cylinder.

7. In combination, a driven shaft, an oscillating cam mounted on said shaft to turn relative thereto about an axis coincident with the axis of rotation of the shaft and formed with a continuous but non-circular cam surface surrounding said axis, a pair of rockers each pivotally connected to said shaft and engaging said surface at angularly displaced points and moved thereby angularly about their pivotal connections to said shaft on relative angular movements of said cam and shaft, and means for intermittently holding said rockers against angular movement about their pivotal connections to said shaft.

8. In combination, a driven shaft, an oscillating cam mounted on said shaft to turn relative thereto about an axis coincident with the axis of rotation of the shaft and formed with a continuous but non-circular cam surface surrounding said axis, a pair of rockers each pivotally connected to said shaft and engaging said surface at angularly displaced points and moved thereby angularly about their pivotal connections to said shaft on relative angular movements of said cam and shaft, and means for intermittently holding each of said rockers against angular movement about their pivotal connections to said shaft comprising coöperating piston and cylinder parts connected one to said driven shaft and the other to the rocker and a valve mechanism operating in timed relation to the movement of said cam for trapping a fluid in, and releasing it from said cylinders.

9. In combination, an oscillatory driving element, a driven shaft formed with a liquid chamber, and means for alternately clamping said oscillatory element to, and releasing it from said driven shaft comprising a cylinder and a piston working therein both of which share in the general movements of said shaft but move relatively to one another when said element moves relatively to said shaft and a valve means operating in timed relation with the movement of said oscillating element for intermittently opening and closing communication between said chamber and cylinder.

10. In combination, a driven shaft formed with a liquid receptacle and a cylinder and with a channel connecting said cylinder and receptacle, a driving member mounted to oscillate about the axis of rotation of said shaft, a part engaged by said member and moved thereby relatively to the driven shaft on movements of said member relative to said shaft and means for intermittently locking said member to said shaft comprising a piston connected to said part and working in said cylinder and valve mechanism operated in timed relation to the movements of said member for intermittently opening and closing said channel.

11. The combination with driving and driven shafts of a plurality of oscillating elements, means connecting said elements to the driving shaft whereby said elements are oscillated, and means for alternately clamping said elements to and releasing them from said driven shaft comprising a piston individual to each element and moved thereby relative to the driven shaft on movements of the element relative to the latter, said driven shaft being provided with a plurality of cylinders one receiving each of said pistons and with a fluid chamber and channels connecting said chamber and cylinders and a valve mechanism operating in timed relation with the movements of the driving shaft for alternately opening and closing said channels.

12. The combination with driving and driven shafts, of a plurality of oscillatory elements, means connecting said elements to the driving shaft whereby said elements are oscillated, said driven shaft being formed with a plurality of cylinders one for each of said elements and with a liquid chamber and with channels connecting said cylinders to said chamber, pistons working in said cylinders one individual and connected to, and moved in said cylinder by each element on a movement of the latter relative to said driven shaft, and a valve mechanism operating in timed relation to the movements of the driving shaft for alternately opening and closing said channels.

13. In combination, a driven shaft formed with a central chamber and with a plurality of cylinder chambers and with channels connecting said cylinder chambers to said central chamber, of a rotary valve alternately opening and closing communication between said central chamber and cylinder chambers through said channels, a driving shaft, a plurality of elements connected to and oscillated by said driving shaft, and means for alternately clamping said elements to and releasing them from said driven shaft comprising pistons, one individual to each of said elements and each working in a corresponding cylinder chamber and engaged and moved by the corresponding element on movements of the latter relative to the driving shaft.

14. In combination, a driven shaft formed with a central chamber and with a plurality of cylinder chambers and with channels connecting said cylinder chambers to said central chamber, of a rotary valve alternately opening and closing communication between said central chamber and cylinder chamber through said channels, a driving shaft, connections whereby said valve is rotated by said driving shaft, a plurality of elements connected to and oscillated by said driving shaft, and means for alternately clamping said elements to and releasing them from said driven shaft comprising pistons one individual to each of said elements and each working in a corresponding cylinder chamber and engaged and moved by the corresponding element on movements of the latter relative to the driving shaft.

ARTHUR BROCK, Jr.
AUGUST J. MOTTLAU.

Witnesses:
ARNOLD KATZ,
D. STEWART.

Copies of this patent may be obtained for five cents each, by addressing the "Commissioner of Patents, Washington, D. C."